Figure 9:
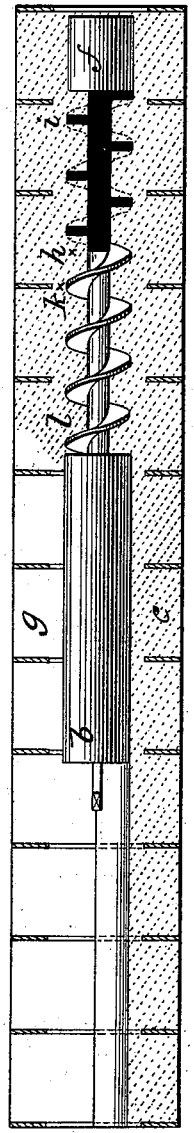

(No Model.) 2 Sheets—Sheet 1.
T. WRIGLEY.
CONVEYER AND METHOD OF MANUFACTURING SAME.
No. 511,393. Patented Dec. 26, 1893.
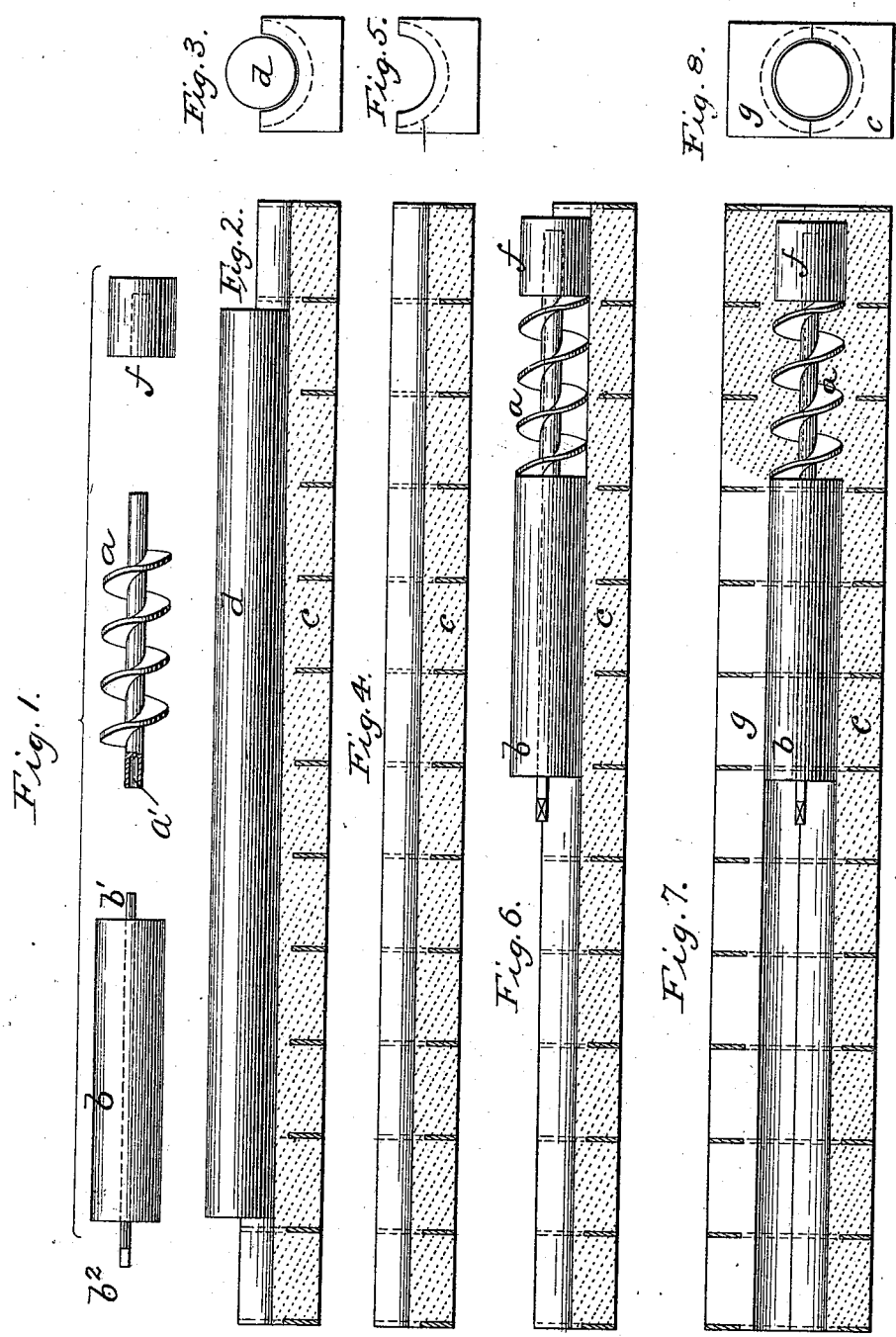
Witnesses
Geo. Bindine.
Horace A. Dodge.
Inventor,
Thomas Wrigley
per Dodge Sons.
Att'ys (No Model.) 2 Sheets—Sheet 2.

T. WRIGLEY.
CONVEYER AND METHOD OF MANUFACTURING SAME.

No. 511,393. Patented Dec. 26, 1893.

Witnesses
C. C. Burden
Horace A. Dodge

Thomas Wrigley,
Inventor,
per Dodge Sons,
Atty's

UNITED STATES PATENT OFFICE.

THOMAS WRIGLEY, OF TODMORDEN, ENGLAND.

CONVEYER AND METHOD OF MANUFACTURING SAME.

SPECIFICATION forming part of Letters Patent No. 511,393, dated December 26, 1893.

Application filed June 8, 1893. Serial No. 476,953. (No model.) Patented in England April 6, 1891 No. 5,854.

*To all whom it may concern:*

Be it known that I, THOMAS WRIGLEY, mill-manager, of Waterside House, Todmorden, in the county of York, England, have invented certain new and useful Improvements in Conveyers and Methods of Manufacturing the Same, (for which I have received Letters Patent in England, No. 5,854, dated April 6, 1891,) of which the following is a specification.

This invention relates to cast metal worms or Archimedean screws for conveying or elevating grain, flour, coal or similar substances or for conveying or elevating liquids or for other purposes, and consists in an improved method of molding said worms or Archimedean screws for casting them of iron, steel, or other metal, and in an improved form or construction of the cast worms or screws. The worms for conveying or elevating purposes have heretofore been made of wrought iron, tin plate or other sheet metal, or of helical bars or rods in various forms, which blades or rods are fixed upon a central shaft, or upon the outside of a hollow cylinder or tube. The worms thus made possess insufficient strength where heavy materials have to be conveyed or elevated, or forwarded against pressure, and if strongly made are expensive. Short worms for worm wheel gearing or for screw piles cast of iron or other metal from patterns, have hitherto been cast with the blades of the worm or screw at right angles to the shaft or center and also generally with short blades considerably thicker at the root than at the outer edge of the blade, and have never been intended for and are quite unfitted for elevating or conveying purposes. Worms intended for conveying purposes have been cast, under various disadvantages, from patterns formed or cut up into sections, and have also been cast in portions and afterward fastened together on a central shaft or otherwise, but no worms or screws suitable for conveying or elevating purposes have hitherto been cast in long lengths in a mold formed from a pattern all in one piece and of large diameter with blades of uniform thickness or with the radial surface or genatrix of such blades inclined or curved to the axis in consequence of the difficulties of molding them. These difficulties of molding and casting worms or screws for elevating and conveying purposes, are overcome by my improved method of molding said worms or Archimedean screws by means of which they can be cast of large diameter and in any desired lengths up to twenty feet, or even larger if required, although ten or twelve feet lengths are most convenient in use, and with blades if desired either of uniform or varying thickness, and also if desired with the radial surface or the genatrix of said blades inclined or curved to the axis instead of being at right angles thereto.

The manner of carrying out my invention is described in the following statement, reference being made to the drawings appended, in which—

Figure 10:
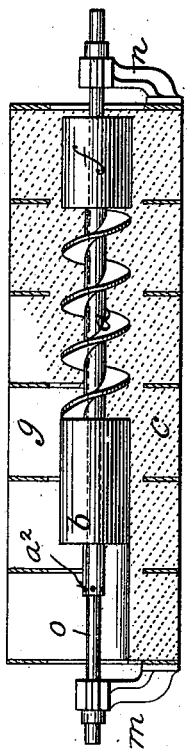
Figure 11:
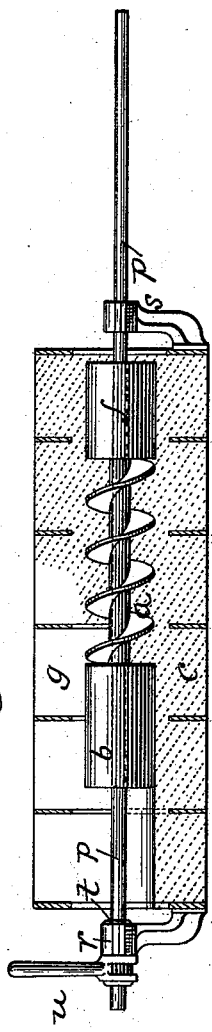

Figure 1 is a side elevation of the pattern and attendant parts; Figs. 2 to 9 inclusive, views representing the pattern and mold at different stages in the process; Figs. 10 and 11, views illustrating certain modifications; and Fig. 12, a side view, partly in section, of the screw as cast under my process.

I cut a pattern $a$, Fig. 1, of a worm or screw in a lathe, or otherwise make the same, the pattern having a length suitable to the pitch and diameter of the worm required, for instance containing three or four turns or threads of the screw. To one end of this pattern $a$, I attach a cylindrical part $b$ in any convenient manner, for instance, by entering the projecting end $b'$ of a shaft passing through said cylindrical part $b$ into a socket $a'$ of the pattern $a$ and fixing it therein by means of screws or equivalent means. This cylindrical part or guide $b$ is made of the same diameter as the outer diameter of the screw or worm $a$. For molding the worm or screw a molding box is required, such as is generally used for molding ordinary pipes, but with a round hole at each end when the boxes are fastened together, slightly larger than the diameter of the worm or screw to be molded, and the boxes also require to be longer than the length of the worm or screw intended to be cast. I first form a semicircular mold of sand in the bottom box $c$, Fig. 2, by means of a cylindrical or ordinary pipe pattern $d$, Figs. 2 and 3, in the usual manner, the removal of said pattern $d$ leaving the box $c$ as shown by Figs. 4 and 5, ready for the reception of the worm pattern. The pattern $a$ is then placed into the mold thus prepared, the cylindrical core pattern $f$ having first been loosely placed upon the other end shank of the worm pattern $a$, as shown by Fig. 6; the top box $g$, Figs. 7 and 8, is then placed upon the bottom box $c$ and cottered fast to the bottom box as usual, and not removed until the casting is complete. The sand is then rammed in round the pattern $a$ and between the blades or threads of the screw and the top box filled with sand and rammed down in the part extending over a part of the worm pattern $a$, as indicated on Fig. 7. When this has been done, the pattern $a$ with the cylindrical guide $b$ is turned by means of a spanner placed upon a square $b^2$ on the end of the shaft of the cylindrical guide $b$, and this guide $b$, together with the worm pattern $a$, is thereby partly screwed out of the sand and along the semicircular mold, the guide $b$ and the pattern $a$ sliding along the same, but the loose core pattern $f$ being left in its place, as shown on Fig. 9, where the worm pattern is shown as having received two or three turns, and has consequently moved along the box a corresponding distance, whereby the pattern is withdrawn from the mold for the distance or length $h\ i$, and the pattern $a$ is still kept in the sand previously rammed in for the distance $k\ h$, so that when the ramming in of the sand for the further length $l\ k$, Fig. 9, of the pattern $a$ now exposed is effected, the empty part $h\ i$ of the mold where the pattern $a$ has left is not damaged thereby. After the length $l\ k$ has been rammed up, the pattern is again screwed farther out of the sand and the foregoing operations are repeated until the desired length of worm has been molded, when the sand is rammed in over the cylindrical part $b$ or a portion of the same, and the pattern $a$ finally screwed out of the sand and through the opening in the end of the boxes. The pattern $f$ is then removed, through the opening at that end of the boxes, and replaced by a sand or loam core, and a similar core inserted into the hollow mold left by the cylindrical pattern $b$, at the other end of the worm mold, and the molds are provided with the usual openings for pouring and ventilating.

A modification of this method of molding consists in mounting the worm or screw pattern upon a shaft, which may be fixed or movable in bearings supported by removable brackets attached to the ends of the molding box. Fig. 10 shows an arrangement of molding boxes with two end brackets $m\ n$, fixed to the ends of the bottom box, into which the shaft $o$ is placed and held longitudinally in its position by collars or set hoops or equivalent means. The pattern for the worm or screw is bored out for the shaft to pass through and is loose on the same. The bottom box may have a semicircular mold formed in it in the manner hereinbefore described before the shaft $o$ with the pattern $a$, is placed into position, or the bottom box may be rammed up only to about the level of the under side of the pattern. The shaft $o$ with pattern $a$ is then placed in the box and temporarily fixed so as to prevent them from turning, and the sand rammed up around the pattern $a$. After this, the fixings of the shaft $o$ or pattern $a$ are loosened and the pattern screwed forward, by any suitable means, for instance, by a tommy inserted into holes $a^2$ in the boss of the pattern, or by rotating the shaft $o$, the pattern being connected in this case to the shaft by a sliding key fitting a groove in the shaft or a long feather on the shaft and a groove in the pattern. When a semicircular mold is first made, a short cylindrical pattern at the front end of the pattern $a$ similar to pattern $b$ hereinbefore referred to, but shorter, is preferably used, such core pattern being wedged against the top box bars to prevent the worm pattern from shifting and the shaft $o$ from bending while the ramming up of the sand proceeds successively in the manner hereinbefore described.

Figure 12:

Instead of the arrangement described with reference to Fig. 10, the pattern of the worm or screw may be fixed upon a shaft $p$, as shown by Fig. 11, and the shaft arranged so that it can revolve and slide in bearings $r\ s$ attached to the bottom box, or if preferred, in independent bearings or pedestals between which the molding box is placed. The bearing $s$ is fitted with a bush $t$ so that the bush can revolve but not move endwise, and the bush is fitted with a key sliding in a long grove in the shaft $p$, or vice versa, and rotated when required by means of a ratchet brace $u$ or other suitable gearing by hand or power. The molding proceeds in a similar manner as hereinbefore described with reference to Fig. 10 and previous figures, the pattern $a$ being drawn forward when required by turning the shaft $p$ which will slide through or along the bearings as it is carried forward by the worm pattern. By these methods of successively screwing forward and molding a convenient short length of the pattern, it will be understood that worms or Archimedean screws of and desired length of the pattern as aforesaid and of any required diameter suitable for conveyers, elevators, or other such like purposes can be molded and cast, with blades of uniform thickness throughout, or of varying thickness, and with the radii of said blades or the genatrix of the helical surface either at a right angle to or inclined to the axis, as shown by Fig. 12, partly in section and partly in outside view, or curved to the axis. The inclined or curved form of blade, which has hitherto not been made of cast metal, in consequence of the difficulty of molding the same, possesses great advantages, making the worm considerably stiffer and capable of supporting greater strains both in the longitudinal and transverse direction, and bringing the material to be conveyed or elevated toward the center, thereby relieving the surrounding troughs or tubes from pressure and reducing the friction in or on said troughs or tubes. The central shafts or parts of the said worms may be made solid or hollow, a core being in the latter case inserted into the mold and worms or screws may also be cast by my method of any desired length or diameter as aforesaid with a helical blade only and without a central shaft, the turn of the helical blade or screw forming its own support.

An important part of all my before described methods of molding and casting is that instead of parting the box or sand in the usual way, the top box is, as is above stated, not removed or taken off during any part of the process of molding or casting, until the casting is completely set and then for the purpose only of removing the casting, and thus the casting is smooth and without seams or scars from the imperfect joining of the parts of the pattern and of the boxes, so that all subsequent filing or trimming of the casting is rendered unnecessary.

I am aware that it is not new to traverse a screw-pattern through a completely-filled and previously-rammed mold-box.

Having now particularly described and ascertained the nature of my said invention and in what manner the same is to be performed, I declare that what I claim is—

1. The method of making molds for conveyers, which consists in ramming the sand about a pattern; then moving the pattern lengthwise by screwing it out of the sand; then ramming sand about the exposed portion of the pattern; and repeating these operations until the desired length of mold has been obtained.

2. The method of making molds, which consists in forming in the sand a semicircular trough; placing in this trough a short pattern of the screw to be cast; ramming the sand about the pattern; moving the pattern lengthwise into an open portion of the trough; ramming the sand about the exposed part of the pattern; and repeating these operations until a mold of the desired length has been obtained.

3. The method of making molds, which consists in forming in the sand a semicircular trough; placing in this trough a short pattern of the screw to be cast and a cylindrical block; ramming sand about the pattern; then moving the pattern and its supporting block lengthwise by turning them; then ramming sand about the exposed part of the pattern; and repeating these operations until the desired length of mold has been obtained.

In witness whereof I hereunto set my hand in the presence of two witnesses.

THOMAS WRIGLEY.

Witnesses:
W. S. HOLLINRAKE,
    *Pit House, Todmorden, Clerk.*
RD. A. THORP,
    *Waterside, Todmorden.*